United States Patent [19]

Hiramatsu et al.

[11] Patent Number: 4,473,284
[45] Date of Patent: Sep. 25, 1984

[54] IN-FOCUS STATE DETECTING DEVICE FOR CAMERA

[75] Inventors: Akira Hiramatsu; Masayoshi Yamamichi; Takashi Kawabata, all of Kanagawa, Japan

[73] Assignee: Canon Kabushiki Kaisha

[21] Appl. No.: 420,311

[22] Filed: Sep. 20, 1982

[30] Foreign Application Priority Data

Oct. 5, 1981 [JP] Japan .......................... 56-148005[U]

[51] Int. Cl.$^3$ .............................................. G03B 13/18
[52] U.S. Cl. ..................................... 354/402; 354/409
[58] Field of Search ..................... 354/25, 59, 402–409, 354/476, 478, 479, 481–483

[56] References Cited

U.S. PATENT DOCUMENTS

| | | | |
|---|---|---|---|
| 4,252,425 | 2/1981 | Aoki et al. | 354/25 |
| 4,264,160 | 4/1981 | Aoki | 354/25 |
| 4,286,850 | 9/1981 | Aoki | 354/25 |
| 4,309,093 | 1/1982 | Kuwayama et al. | 354/59 |
| 4,329,032 | 5/1982 | Aoki et al. | 354/25 |
| 4,381,890 | 5/1983 | Wallace | 354/59 |

*Primary Examiner*—L. T. Hix
*Assistant Examiner*—Douglas S. Lee
*Attorney, Agent, or Firm*—Toren, McGeady and Stanger

[57] ABSTRACT

An in-focus state detecting device which is provided with erroneous signal discriminating means is arranged such that: The lens cap of a photo-taking lens has the whole surface or a part of the surface thereof formed into a diffuse transmission face. With this lens cap put on the photo-taking lens, a light flux is allowed to be diffused by the diffuse transmission face to obtain a uniform brightness face at the cap. Then, a light flux from the uniform brightness face of the cap is guided to the in-focus detecting device to perform a checking operation with the discriminating means to check for an erroneous action of the device.

13 Claims, 6 Drawing Figures

IN-FOCUS STATE DETECTING DEVICE FOR CAMERA

BACKGROUND OF THE INVENTION

1. Field of the Invention:

This invention relates to a camera in-focus detecting device which is arranged to permit checking the action thereof.

2. Description of the Prior Art:

Many focusing methods have been proposed. In a so-called a TTL focusing method the focus a photo-taking optical system is detected by guiding light passing through the photo-taking optical system to a photo-electric focus detecting device. In placing such an in-focus detecting device within a single-lens reflex camera, the detecting device must be arranged in a limited space available there. Therefore, it has been a general practice to dispose it beneath a movable mirror of the camera. Meanwhile, since the movable mirror is subject to repetitive upward and downward moving operations, air about the mirror tends to be fraught with minute dust and the like. Such dust in the air then tends to stick to the light receiving surface of the detecting device. In such a case, the sticking dust or the like affects the in-focus detecting device and results in generation of an erroneous signal.

SUMMARY OF THE INVENTION

It is an object of this invention to solve the above stated problem by providing erroneous signal discriminating means at an in-focus detecting device of a camera with the discriminating means arranged to check for any erroneous action to be performed by the in-focus state detecting device.

It is another object of the invention to provide a diffuse transmission face formed on a lens cap which is arranged such that, with the lens cap put on a photo-taking lens, a uniform brightness face formed at the cap by the provision of the diffuse transmission face is used in performing checking for an erroneous action of the in-focus state detecting device.

It is a further object of the invention to provide an arrangement which permits detachably mounting a protection member on the lens cap for protecting the diffuse transmission face of the lens cap.

These and further objects and features of the invention will become apparent from the following detailed description of preferred embodiments thereof taken in conjunction with the accompanying drawings.

DETAILED DESCRIPTION OF PREFERRED EMBODIMENTS

Figure 1:
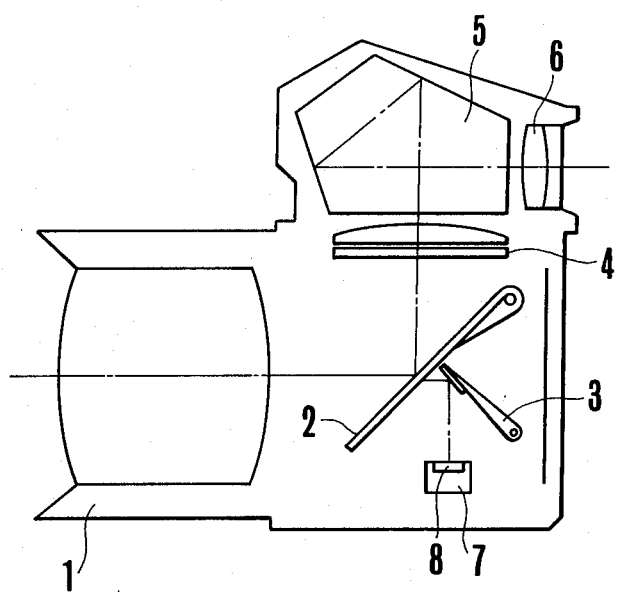
FIG. 1 is a schematic illustration showing a single-lens reflex camera equipped with an in-focus state detecting device as an embodiment of the invention.

Referring to FIG. 1 which shows the whole arrangement of a camera including an in-focus state detecting device as embodiment of the invention, the camera comprises a photo-taking lens 1; a main movable mirror 2 which has either the whole surface thereof or a portion of the surface thereof arranged to serve as beam splitter such as a semi-transparent mirror; an auxiliary movable mirror 3 which is arranged to guide light coming through the main movable mirror 2 to a light receiving surface of the in-focus state detecting device 7; a focusing glass 4, a penta-prism 5; and an eye-piece 6 which forms a view-finder optical system in conjunction with the photo-taking lens 1 and the main movable mirror 2. The in-focus state detecting device 7 is disposed on a bottom part of the camera below the auxiliary mirror 3. The device 7 produces a signal representative of the in-focus adjustment of a photo-taking optical system by receiving a light flux reflected by the auxiliary movable mirror 3.

Figure 2:
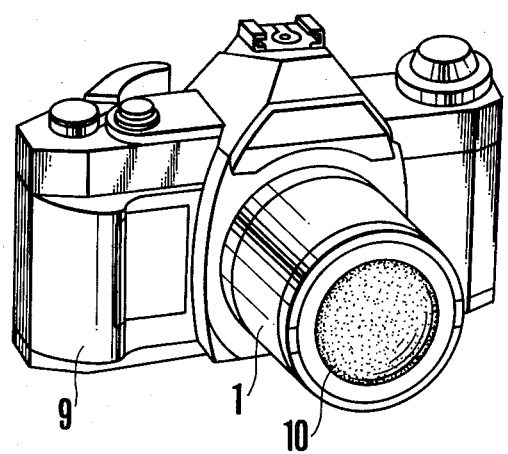
FIG. 2 is an oblique view showing the appearance of the camera shown in FIG. 1 as in a state of having a lens cap put thereon.

The appearance of the camera shown in FIG. 1 is as shown in FIG. 2. This illustration includes the photo-taking lens 1; a camera body 9; and a lens cap 10. The whole surface or a portion of the surface of the lens cap is arranged to be a diffuse transmission face.

Figure 3:
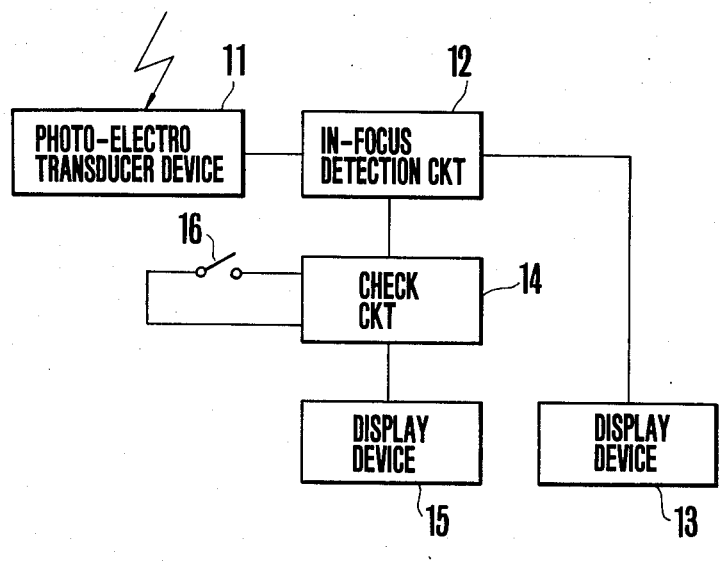
FIG. 3 is a block diagram showing the control circuit arrangement of the in-focus state detecting device of FIG. 1.

Referring to FIG. 3 which is a block diagram of the circuit arrangement of the in-focus state detecting device 7 shown in FIG. 1, the device 7 includes a photo-electro transducers device 11 which is disposed at the light flux incident surface 8; an in-focus detection circuit 12 which is arranged to detect an in-focus state from the signal output of the photo-electro transducer device 11; a display device 13 which displays an in-focus state in response to the signal output of the in-focus detection circuit 12; a check circuit 14 for the in-focus detection circuit 12; a display device 15 which displays the signal output of the check circuit 14; and a switch 16 provided for the check circuit 14.

Figure 4:
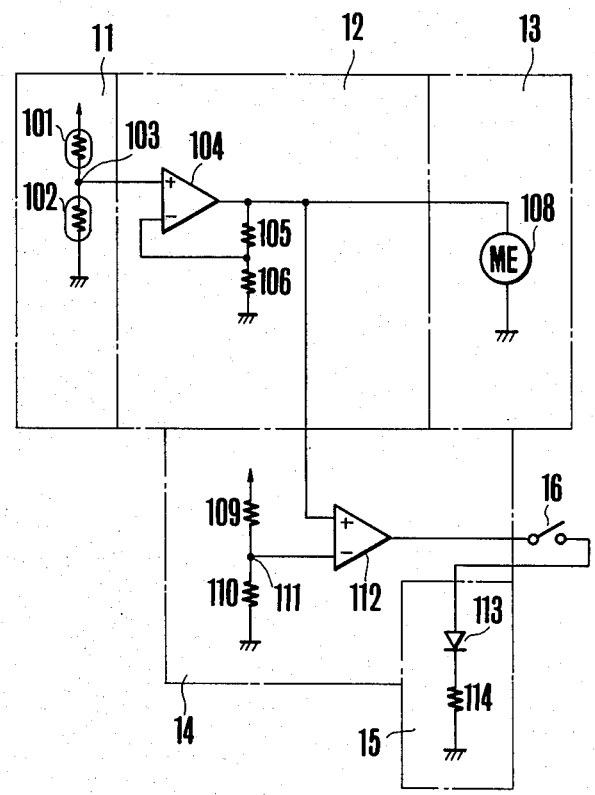
FIG. 4 is a circuit diagram showing the details of the block diagram of FIG. 3.

The details of the in-focus detection circuit shown in FIG. 3 are as shown in the circuit diagram of FIG. 4, wherein: Reference numerals from 11 through 15 denotes the parts shown in blocks in FIG. 3 while a numeral 16 denotes the switch shown in FIG. 3. The photo-electro transducer device 11 includes known photo-electro transducer elements 101 and 102 (series and parallel type CdS sensor). The transducer device 11 produces a signal representative of the sharpness of an image at a connection point 103 according to an image incident upon these elements 101 and 102. The in-focus detection circuit 12 includes an operational amplifier 104 and resistors 105 and 106 and produces an output representative of sharpness from the output terminal of the operational amplifier 104. The display device 13 is equipped with a meter 108 which indicates a focusing state in response to the signal output of the in-focus detection circuit 12. The display device 13 is arranged such that it enables the operator to obtain the best image formation by carrying out a focusing operation in such a way as to bring the pointer of the meter 108 to a peak position thereof. The check circuit 14 includes resistors 109 and 110 and a comparator 112 which is arranged to compare the sharpness signal from the operation amplifier 104 with a reference level provided at a connection point 111 between these resistors 109 and 110. The other display device 15 includes a light emitting diode (LED) 113 and a resistor 114.

The embodiment which is arranged as described above operates as follows: When the lens cap 10 is put on the front of the photo-taking lens 1 on the camera body 9, a portion of a light flux is transmitted and diffused through the lens cap 10 as a portion of or the whole of the surface of the lens cap 10 is formed as diffuse transmission face. A uniform brightness face is thus formed on the lens cap 10 by this diffusion. The light flux from this uniform brightness face enters the photo-taking lens. As shown in FIG. 1, a portion of this light flux passes through the main movable mirror 2 and is guided by the auxiliary movable mirror 3 to the light flux incident surface 8 of the in-focus state detecting device 7. The guided light flux then comes to the photo-electro transducer device 11. Normally, the signal output of the photo-electro transducer device 11 is received by the in-focus detection circuit 12 and the result of this is displayed at the display device 13. However, in the case of checking for an erroneous action, the information of the uniform brightness face is received by the photo-electro transducer device 11 and the output signal thereof is changed into a focusing signal through the in-focus detection circuit 12; and then the result of this is confirmed by the check circuit 12 and is displayed by the other display device 15. In other words, the switch 16 is turned on at the time of checking for an erroneous action. With the switch 16 turned on, the comparator 112 compares the sharpness signal of the operational amplifier 104 with the reference level of the connection point 111. If the result of comparison shows an erroneous action level, a warning is given by the LED 113 and the resistor 114 informing the operator of the possibility of an erroneous action of the device. Since there is the possibility of an erroneous signal of the device when the LED lights up, it indicates necessity to remove dust or the like from the light flux incident surface of the in-focus state detecting device.

Figure 5:
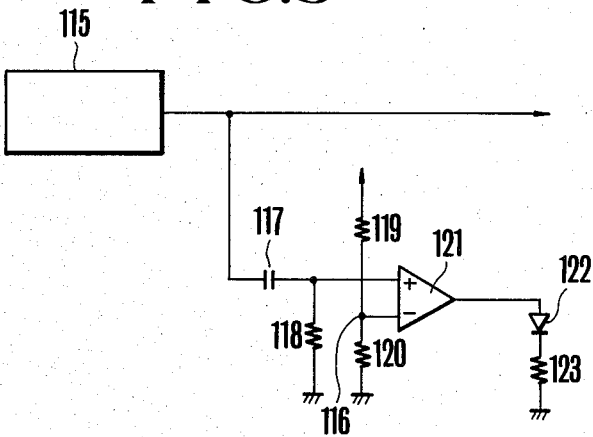
FIG. 5 is another circuit diagram showing a modification of the circuit shown in FIG. 4.

Another example of the in-focus state detecting device embodying the invention is as shown in FIG. 5. In this case, the output of a time-seriated video signal producing device 115 of a TV camera or the like is differentiated through CR differentiation circuits 117 and 118. The level of the differential signal thus obtained is compared by a comparator 121 with a reference level obtained at a connection point 116 between resistors 119 and 120. When the level of the differential signal is higher than the reference level, a resistor 123 causes a light emitting diode (LED) 122 to light up to give an warning against an erroneous action.

Figure 6:
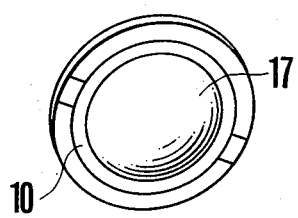
FIG. 6 is an illustration showing the lens cap shown in FIG. 2 as in a state of having a protection member mounted thereon.

Further, referring now to FIG. 6, a diffusion face protecting cap or a like member such as a seal as shown in FIG. 6 may be removably provided in accordance with the invention to protect the diffuse transmission face of the lens cap which is described in the foregoing from the adverse effect of dust, a smear, a scratch or the like. The protector is arranged to be readily removable in checking a focusing state. The protector cap or seal is preferably made of a light shielding material which is capable of shielding the lens cap from light.

The in-focus state detecting device according to the invention is provided with means for discriminating an erroneous action. This permits checking for an erroneous action of the detecting device. It is intrinsically difficult to use a uniform brightness face for focusing. Therefore, it has been hardly possible to obtain an in-focus detection signal from an in-focus state detecting device using a uniform brightness face and, if dust or the like sticks to the light flux incident surface thereof, the device would erroneously produce an in-focus detection signal therefrom. To solve this problem in accordance with the invention, the erroneous action discriminating means is arranged in combination with a positively formed uniform brightness face to permit checking for an erroneous action. In accordance with the invention, the lens cap which has the whole or a portion of its surface formed into a diffuse transmission face is detachably attached to a photo-taking lens, so that a uniform brightness face required in carrying out checking for an erroneous action can be obtained without difficulty.

In the foregoing embodiments, a uniform brightness face is formed on the lens cap. However in the present invention, an object having no contrast, which lies nearby may be utilized as a uniform brightness face without forming it on the lens cap. For example, the sky, white walls etc. may be used as the uniform brightness face.

What we claim:

1. An in-focus state detecting device for a camera, comprising:
   photo-electro transducer means;
   in-focus detecting means capable of producing an in-focus signal by receiving an output signal of said photo-electro transducer means;
   means for forming a uniform brightness face; and
   discriminating means for determining whether said in-focus detecting means is properly operating, said discriminating means being arranged to sense the output signal of the in-focus detecting means which corresponds to light from said uniform brightness face forming means.

2. A device according to claim 1, further including display means arranged to produce an indicating signal when sensing that the in-focus detecting means does not operate properly.

3. A device according to claim 1, wherein said uniform brightness face is a diffuse transmission face formed on a lens cap.

4. A device according to claim 3, wherein said photo-electro transducer means is arranged to receive light from a photo-taking lens.

5. An in-focus state detecting device for a camera, comprising:
   photo-electro transducer means;
   in-focus detecting means capable of producing an in-focus signal in response to an output signal of said photo-electro transducer means;
   means for forming a uniform brightness face; and
   discriminating means for determining whether an output signal from said in-focus detecting means is properly operating, said discriminating means including:
   (a) reference signal producing means, and
   (b) comparison means for comparing the output signal of said in-focus detecting means with the reference signal of said reference signal producing means, said comparison means being arranged to produce a detection signal when the difference between the levels of the two signals compared reaches a predetermined level; and
   warning means which for giving a warning when the detection signal is produced and applied thereto from said comparison means.

6. A device according to claim 5, wherein said warning means is light emitting display means.

7. A device according to claim 5, further including uniform brightness face forming means arranged such that light from said means is applied to said photo-electro transducer means through said photo-taking lens.

8. A device according to claim 7, wherein said uniform brightness face forming means is a diffuse transmission face formed on a lens cap.

9. An in-focus state detecting device for a camera, comprising:
- photo-electro transducer means;
- in-focus detecting means capable of producing an in-focus signal in response to an output signal of said photo-electro transducer means; and
- discriminating means for determining whether said in-focus detecting means is operating properly, said discriminating means being arranged to respond to the output signal of the in-focus detecting means which correspond to a uniform brightness face.

10. A camera, comprising:
- means forming a light receiving aperture;
- focus detection means for producing a focusing signal in response to light through the aperture;
- reference means for producing a reference signal corresponding to a focusing signal which would occur in response to the focus detection means receiving diffuse light through the aperture, and
- comparison means for comparing the focusing signal with the reference signal from the reference means and for producing an output signal indicative of the comparison.

11. A camera as in claim 10, wherein:
the reference means is arranged for producing a reference signal representing a focusing signal which arises from the response of said focus detection means to light through a diffuser across the light aperture or from a blank area while the focus detection means is otherwise free of visible obstructions.

12. A camera as in claim 10, wherein:
said comparison means includes a display for displaying the signal.

13. A camera as in claim 11, wherein:
said comparison means includes a display for displaying the signal.

* * * * *